(12) United States Patent
Stratton et al.

(10) Patent No.: US 11,733,522 B2
(45) Date of Patent: Aug. 22, 2023

(54) ADVANCED MONITORING SOLUTION OF DISPLAYS

(71) Applicant: Rockwell Collins, Inc., Cedar Rapids, IA (US)

(72) Inventors: Eric P. Stratton, Portland, OR (US); Brandon E. Wilson, Portland, OR (US); David I. Han, Lake Oswego, OR (US); Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 301 days.

(21) Appl. No.: 17/221,202

(22) Filed: Apr. 2, 2021

(65) Prior Publication Data

US 2022/0317446 A1    Oct. 6, 2022

(51) Int. Cl.
*G02B 27/01* (2006.01)
*G02B 27/10* (2006.01)
*G02B 27/14* (2006.01)

(52) U.S. Cl.
CPC ..... *G02B 27/0172* (2013.01); *G02B 27/1013* (2013.01); *G02B 27/14* (2013.01)

(58) Field of Classification Search
CPC . G02B 27/0172; G02B 27/1013; G02B 27/14
USPC ........................................................ 359/630
See application file for complete search history.

(56) References Cited

U.S. PATENT DOCUMENTS

| | | | |
|---|---|---|---|
| 10,109,054 B1 | 10/2018 | Wilson et al. | |
| 10,606,079 B1 | 3/2020 | Keith | |
| 2014/0300632 A1 | 10/2014 | Laor | |
| 2016/0306180 A1* | 10/2016 | Rosa | G03B 33/04 |
| 2018/0088325 A1 | 3/2018 | Brown et al. | |
| 2020/0349874 A1 | 11/2020 | Mills et al. | |
| 2022/0099987 A1* | 3/2022 | Sauermann | H04N 23/55 |
| 2022/0214278 A1* | 7/2022 | Trintchouk | G02B 21/0064 |

FOREIGN PATENT DOCUMENTS

| | | |
|---|---|---|
| CN | 110660036 A | 1/2020 |
| WO | 2019134345 A1 | 7/2019 |

OTHER PUBLICATIONS

Extended Search Report in European Application No. 22166579.7 dated Aug. 18, 2022, 5 pages.

\* cited by examiner

*Primary Examiner* — Collin X Beatty

(74) *Attorney, Agent, or Firm* — Suiter Swantz pc llo

(57) ABSTRACT

A system is disclosed that display configured to transmit a signal that includes a first light configured as a display image and a second light configured as a reference image. The system also includes a beam splitter, a selectively transmissive mirror and a sensor configured to detect the second light. The beam splitter is configured to receive the signal from the display and reflect the signal to the selectively transmissive mirror. The selectively transmissive mirror is configured to receive the reflected signal, transmit the second light toward a sensor, and reflect the first light, wherein the first light is configured with a first bandwidth, wherein the second light is configured with a second bandwidth. The system further includes a corrector lens configured to receive the first light and transmit the first light to an exit pupil.

15 Claims, 6 Drawing Sheets

ADVANCED MONITORING SOLUTION OF DISPLAYS

BACKGROUND

Head-up displays (HUDs) and Head worn displays (HWDs) are increasingly being incorporated into vehicles such as aircraft and ground vehicles, as well as into the tactical gear worn by ground troops. These displays are often required to have control monitoring systems to ensure that the displays are working correctly. For example, the display may freeze, invert the picture, use incorrect brightness, or otherwise malfunction, which could seriously incapacitate the driver or pilot from operating the vehicle. By preventing the display from presenting misleading information to the user via monitoring control systems, display-related accidents may be reduced. Current methods for monitoring a display include designating a set of pixels from the display as test pixels that are not viewed, but monitored by sensors within the display system. These methods reduce the pixels available for display, which becomes more significant as display sizes are reduced, particularly for HWDs. These methods also require separate sensors and/or illuminators (such as a light emitting diode) that are bulky when incorporating adjacent to the test pixels, and may degrade over time, requiring replacement. Accordingly, it is desirable to provide a monitoring solution that does not reduce useable display size, is less intrusive upon the face of the display, and has fewer maintenance/reliability issues than conventional approaches.

SUMMARY

A system is disclosed. In one or more embodiments, the system includes a display configured to transmit a signal. In some embodiments, the signal includes a first light configured as a display image. In some embodiments, the signal further includes a second light configured as a reference image. In some embodiments, the system further includes a sensor configured to detect the second light. In some embodiments, the system further includes a beam splitter configured to receive the signal and reflect the signal. In some embodiments, the system includes a selectively transmissive mirror configured to receive the reflected signal, transmit the second light to the sensor, and reflect the first light, wherein the first light is configured with a first bandwidth, wherein the second light is configured with a second bandwidth. In some embodiments, the system further includes a corrector lens configured to receive the first light and transmit the first light to an exit pupil.

In some embodiments of the system, the system is configured as a head-up display or head worn display.

In some embodiments of the system, the display is configured of at least one of a light-emitting diode display, a micro light emitting diode display (microLED), an organic light-emitting diode display, a liquid crystal display, and active-matrix liquid crystal display, a liquid crystal on silicon display, or a digital light processing display.

In some embodiments of the system, the display is configured as a transmissive display, wherein the transmissive display comprising an illumination source, wherein the illumination source is configured as at least one of a light emitting diode, a laser, or a light source with a dedicated bandwidth configured to leak towards the sensor path.

In some embodiments of the system, the system further includes a field lens configured to receive the signal and transmit the signal to the beam splitter.

In some embodiments of the system, the system further comprises one or more collimating lenses configured to receive and transmit the second light.

In some embodiments of the system, the first bandwidth comprises wavelengths in a range from 480 nm to 580 nm.

In some embodiments of the system, the first bandwidth comprises wavelengths in a range from 530 nm to 560 nm.

In some embodiments of the system, the second bandwidth comprises light wavelengths in a range from 600 nm to 800 nm.

A method is also disclosed. In one or more embodiments, the method includes transmitting a signal to a beam splitter, wherein the signal comprises a first light configured with a first bandwidth and a second light configured with a second bandwidth. In one or more embodiments, the method further includes reflecting the signal to a selectively transmissive mirror. In one or more embodiments, the method includes reflecting the first light toward a corrector lens. In one or more embodiments, the method includes transmitting the second light to a sensor.

In some embodiments of the method, the first bandwidth comprises wavelengths in a range from 480 nm to 580 nm.

In some embodiments of the method, the first bandwidth comprises wavelengths in a range from 530 nm to 560 nm.

In some embodiments of the method, the second bandwidth comprises wavelengths in a range from 600 nm to 800 nm.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
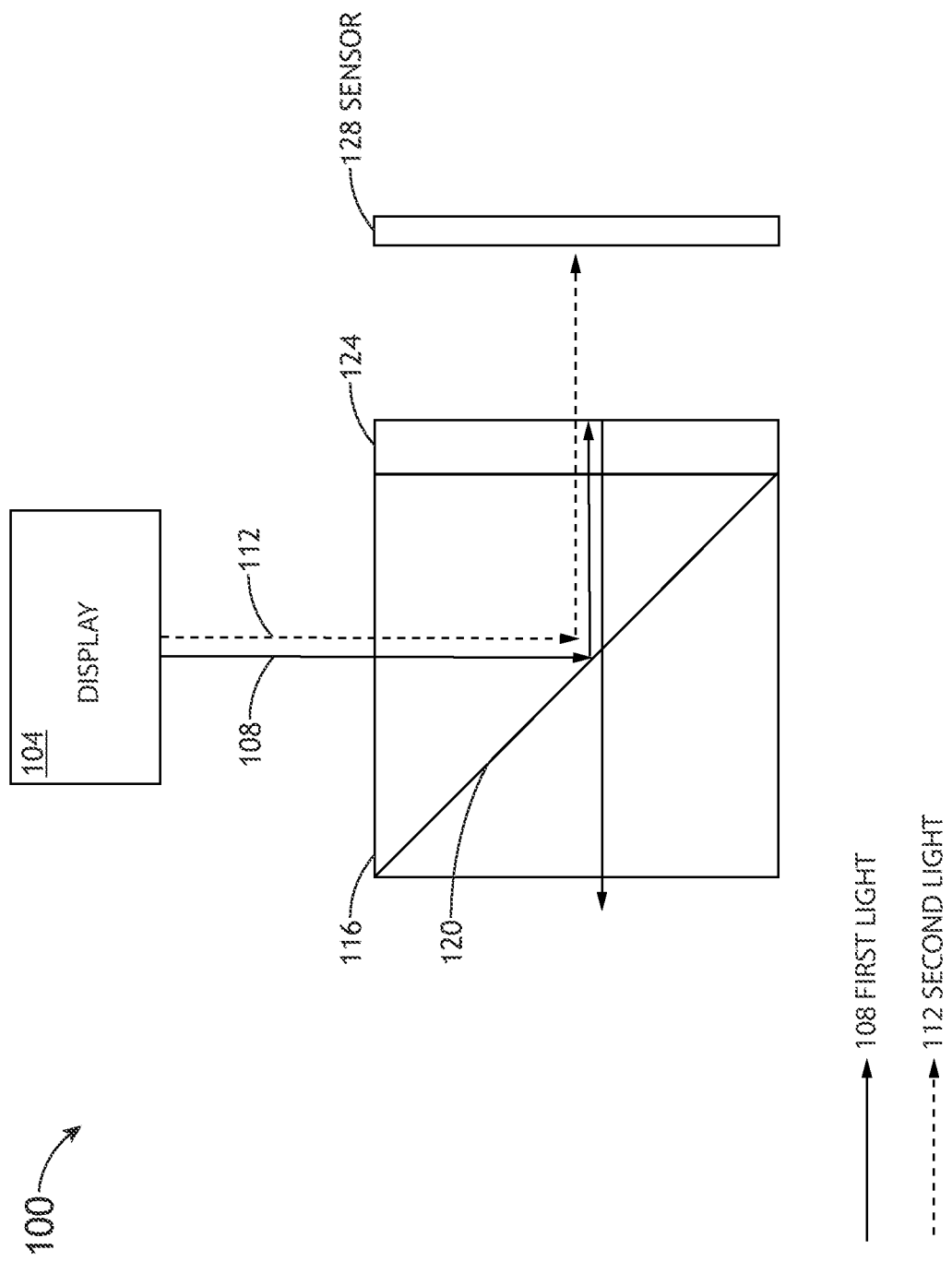
FIG. 1 is a block diagram illustrating a system 100 for monitoring an image source, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system for monitoring a display is disclosed. Specifically, the system is configured as a display having a dual-channel mode, transmitting both a first image within a first bandwidth and a second image within a second bandwidth simultaneously within a single signal. One transmitted, a selectively transmissive mirror splits the signal back into the first image and a second image. The first image is directed to the viewer, while the second image is directed to a detector with means to determine if the display is working correctly.

FIG. 1 is a block diagram illustrating a system 100 for monitoring an image source, in accordance with one or more embodiments of the disclosure. In some embodiments, the system 100 includes a display 104 configured to transmit a signal (e.g., such as a light signal). The display 104 may be configured as any type of display 104 used in imaging systems and may include any transmissive, emissive, or reflective display including but not limited to a light-emitting diode (LED) display, a micro light emitting diode (mLED) display, an organic light-emitting diode display (OLED), a liquid crystal display (LCD), and active-matrix liquid crystal display AMLCD, a liquid crystal on silicon (LCOS) display, a laser, a digital light processing display (DLP) or any light source within a dedicated bandwidth configured to leak towards a sensor path (e.g., towards a sensor). For example, the display 104 may be configured as an LCD configured with an LED illumination source. In another example, In some embodiments, the signal transmitted by the display 104 includes a first light 108 and a second light 112. The first light 108 and/or the second light 112 may be configured, manifested, or purposed as any type of light signal communication including but not limited to an image, a text message, or a pattern. For example, the first light 108 and/or the second light 112 may be manifested as an image of icons to be displayed upon a windshield of a HUD. In another example, the first light 108 and/or the second light 112 may be manifested as a text message displayed on a HWD configured to be read by a user. In another example, the first light 108 and/or the second light 112 may be configured as a test pattern. The first light 108 and/or the second light 112 may present identical, near-identical, or differing images or patterns. For example, the first light 108 may be configured as an image, whereas the second light 112 may be configured as a pattern. For instance, the display 104 may include one or more subpixels dedicated to a specific light path with a specific wavelength of light. In another instance, the display 104 may include a subfield of an image that is illuminated with one or more appropriate wavelengths.

In some embodiments, the first image is configured as a display image for view by a user. For example, the first image may be viewed by the user of a HUD or HWD. In some embodiments, the second image is configured as a reference image. For example, the second image may be detected by quality control mechanisms within the HUD or HWD to ensure that the display 104 is working correctly.

In some embodiments, the first image includes a beam splitter 116 configured to receive the signal and reflect the signal. For example, the beam splitter 116 may be configured to receive the first light 108 and/or the second light 112 via a reflective coating 120. The system 100 may include any type of beam splitter 116 including but not limited to cube beam splitters, plate beam splitters, pellicle beam splitters, and polka-dot beam splitters. The system 100 may also include polarizing or nonpolarizing beams splitters 116. For example, the system 100 may include a nonpolarizing cube beam splitter.

In some embodiments, the system 100 includes a selectively transmissive mirror 124 configured to receive the reflective signal, reflect the first light 108, and transmit the second light 112. For example, when the first signal containing the first light 108 and the second light 112 are received at the selectively transmissive mirror 124 (e.g., from the beam splitter 116), the selectively transmissive mirror reflects the first light 108 back towards the beam splitter 116, while the second light 112 is transmitted through the selectively transmitted mirror 124. The selectively transmissive mirror 124 may be configured adjacent to or disposed upon a face of the beam splitter 116. The selectively transmissive mirror 124 may be configured as any type selectively transmissive medium including but not limited to a notch filter. For example, the selectively transmissive mirror 124 may be configured as a notch filter having a reflective dielectric coating to reflect filtered wavelengths. In another example, the selectively transmissive mirror 124 may be configured as a narrow band notch reflector. In another example, the selectively transmissive mirror 124 may be configured as a multiple band notch reflector. For instance, the selectively transmissive mirror 124 may be configured as a triple notch reflector that reflects a majority of red, green, and blue light, and allows the light in between the peaks of the red, green, blue light to pass through.

The selectively transmissive mirror 124 may reflect any range or ranges of light and/or may transmit any range or ranges of light. For example, the selectively transmissive mirror may selectively transmit light (e.g., transmit greater than 90% of input light) or selectively reflect light (e.g., reflect light greater than 90% of input light) at a 360 nm to 570 nm range, 400 nm to 650 nm range, a 450 nm to 650 nm range, a 500 nm to 650 nm range, a 400 nm to 600 nm range, a 450 nm to 600 nm range, a 500 nm to 600 nm range, a 500 nm to 625 nm range, a 525 to 625 nm range, a 500 nm to 550 nm range, a 530 nm to 570 nm range, a 500 nm to 900 nm range, a 590 nm to 1040 nm range, a 700 to 1300 nm range, or a 800 to 1400 nm range, with all ranges being approximate. For example, the selectively transmissive mirror may reflect all light from 500 nm to 580, reflecting essentially all green light. In another example, the selectively transmissive mirror 124 may transmit all light from 620 nm to 750 nm, transmitting essentially all red light.

In some embodiments, the first light 108 reflected from the selectively transmissive mirror 124 comprises light having a first bandwidth. For example, the first light 108 reflected from the selectively transmissive mirror 124 may comprise light having a first bandwidth configured as the display image. For instance, the display image may be formed from the first light 108 having the first bandwidth, with the display image having a green or greenish color if the first bandwidth is in a range from 500 nm to 580 nm (e.g., approximately 550 nm). The first bandwidth may comprise any range of wavelength including but limited to the ranges listed for the selective reflection of the selectively transmissive mirror 124 as listed herein. For example, the first bandwidth may comprise a range having a highest value of 580 nm. In another example, the first bandwidth may comprise a range having a highest value of 550 nm. Upon reflection, the first light 108 may pass again through the beam splitter 116 to an exit pupil.

In some embodiments, the second light 112 transmitted through the selectively transmissive mirror 124 comprises light having a second bandwidth. For example, the second light 112 reflected from the selectively transmissive mirror 124 may comprise light having a second bandwidth configured as the reference image. For instance, the reference image may be formed from the second light 112 having the second bandwidth, with the reference image having a red color is the second bandwidth is in a range from 620 nm to 750 nm (e.g., approximately 680 nm). The second bandwidth may comprise any range of wavelength including but limited to the ranges listed for the selective transmission of the selectively transmissive mirror 124 as listed herein. For example, the second bandwidth may comprise a range having a lowest value of 580 nm.

In some embodiments, the system includes a sensor 128 configured to detect the second light 112. The sensor 128 may be configured as any type of light detector including but not limited to a photoresistor, a photodiode, a phototransistor. The sensor may take any form including but not limited to a single photodiode or a charged coupled device (CCD) camera.

In embodiments, the system 100 may utilize any color or bandwidth of light that is reflected off of the selectively transmissive mirror 124 toward the user or display screen and may utilize any color or bandwidth of light that is transmitted through the selectively transmitted mirror to the sensor. For example, for a HUD that utilizes green-only viewing on the display screen, green light (e.g., the first light 108) is transmitted from the display 104 and selectively reflected via the selectively transmissive mirror 124 toward the display screen, while a red light (e.g., the second light 112) is transmitted from the display 104 and selectively transmitted through the selectively transmissive mirror 124 toward the sensor 128. In another example, for a HUD that utilizes a full color RGB display, RBG light (e.g., the first light 108) is transmitted from the display 104 and selectively reflected via the selectively transmissive mirror 124 toward the display screen, while infrared light (e.g., the second light 112) is transmitted from the display 104 and selectively transmitted through the selectively transmissive mirror 124 toward the sensor 128.

In some embodiments, the system 100 may further include one or more filters configured to filter either the first light 108 or the second light 112. For example, a filter may be placed in the path of the first light 108 after the first light 108 has reflected off of the selectively transmissive mirror 124. For instance, in the case of the display having an RBG (e.g., first light 108) image with an infrared (e.g., second light 112) reference signal, the filter may filter out any extraneous infrared light, preventing the light from reaching the HUD display screen. In another example, a filter may be place in the path of the second light 112 after the second light 112 has transmitted through the selectively transmissive mirror 124. For instance, in the case of the display having an RBG (e.g., first light 108) image with an infrared (e.g., second light 112) reference signal, the filter may filter out any extraneous RBG light, preventing the RBG light from reaching the sensor 128.

Figure 2:
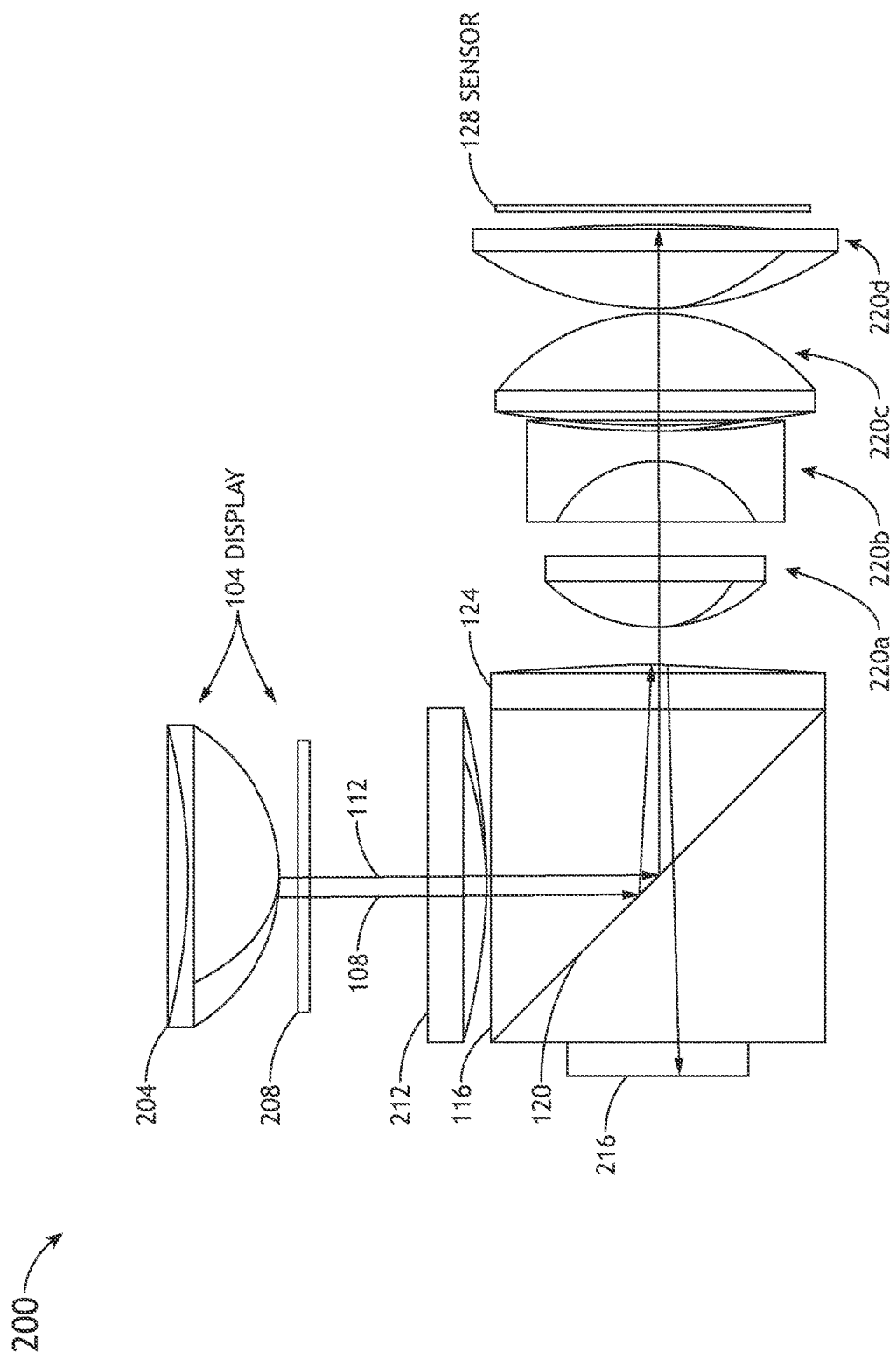
FIG. 2 is a block diagram illustrating a system 200 for monitoring an image source, in accordance with one or more embodiments of the disclosure.

FIG. 2 is a block diagram illustrating a system 200 for monitoring an image source, in accordance with one or more embodiments of the disclosure. The system 200 may include one or more, or all of the components as system 100, and vice-versa. For example, the system 200 includes a display 104 configured as an illuminator 204 optically coupled to an LCD layer 208.

In some embodiments, the system 200 includes a field lens 212 disposed on or adjacent to the beam splitter 116 configured to receive the signal from the display 104 and transmit the signal to the beam splitter 116. The field lens 212 may include a diffractive surface and/or is configured as a plano-convex aspherical lens. The field lens 212 may be manufactured from optical glass or plastic material.

In some embodiments, the system 200 further includes a corrector lens 216. The corrector lens may be configured to adjust the first light 108 exiting the beam splitter 116. For example, the corrector lens may be configured to focus or collimate the first light 108 as it exits the beam splitter 116.

In some embodiments, the system 200 further includes one or more focusing lenses 220*a-d*. The one or more focusing lenses are configured to focus the second light 112 exiting the beam splitter as it transmits through the one or more focusing lenses 220*a-d* to the sensor 128. For example, the one or more focusing lenses 220-*a-d* may be configured to focus the second light 112 onto the sensor 128.

Figure 3:
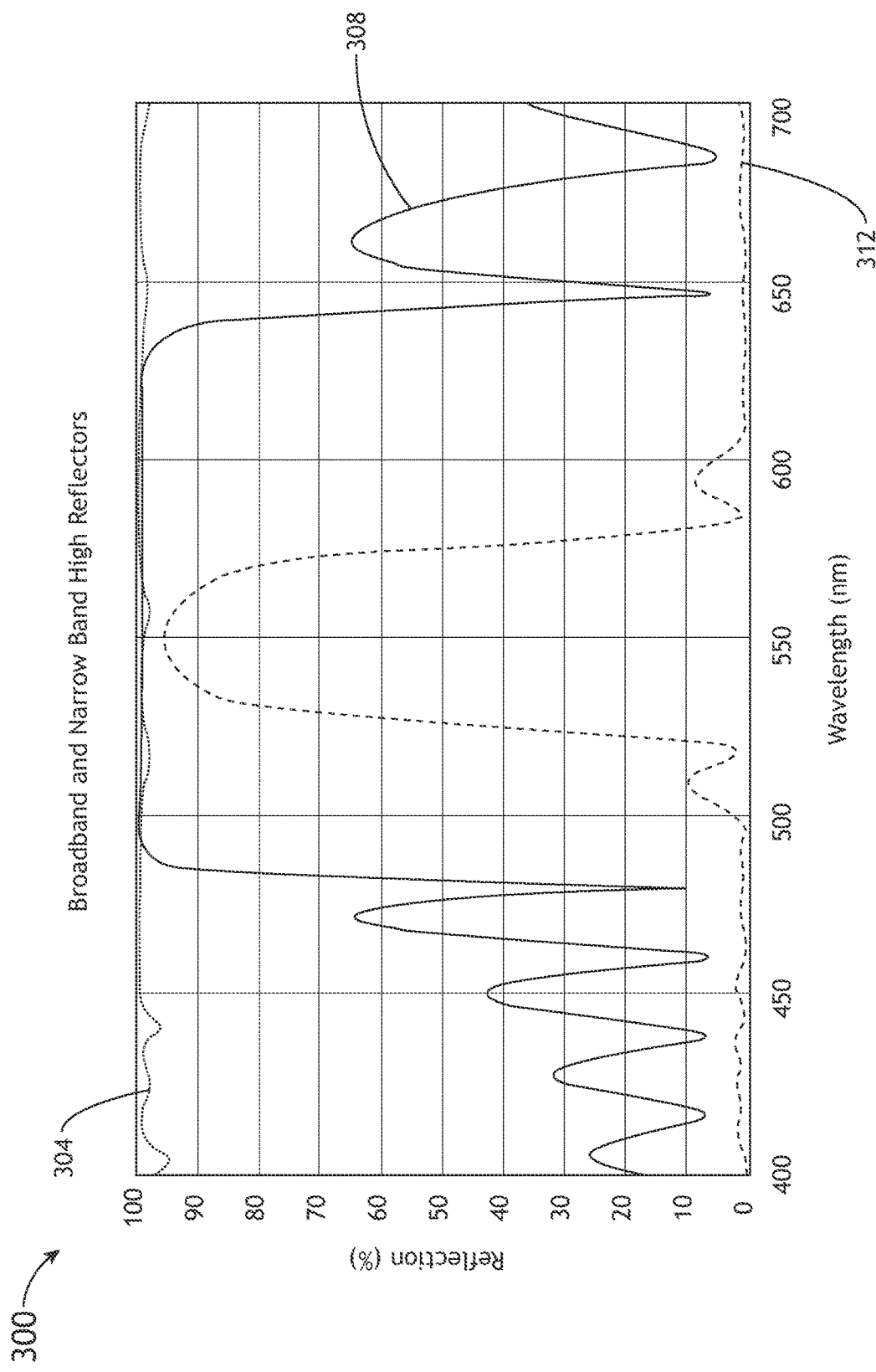
FIG. 3 is a graph illustrating the reflection capabilities of a selective transmission mirror, in accordance with one or more embodiments of this disclosure.

FIG. 3 is a graph 300 illustrating the reflection capabilities of a selective transmission mirror 124, in accordance with one or more embodiments of this disclosure. The graph 300 describes the percent reflection (e.g., the Y-axis) for a visible broadband reflector 304, a single stack high reflector 308, and a representative selective transmissive mirror 124 as a function of wavelength (e.g., the X-axis). As shown in the graph 300, the visible broadband reflector 304 reflects all light at greater than 90% reflection at all wavelengths, and the single stack high reflector 308 reflects broadly reflects light at over 90% reflection (e.g., from 475 nm to 650 nm, while allowing approximately 10% reflection for most of the remaining wavelengths from 400 nm to 700 nm. The selective transmissive mirror 124 reflects light at greater than 80% at a narrow range (e.g., 530 nm to 575 nm) while reflecting essentially zero light at wavelengths greater than 610 nm and wavelengths less than 500. The selective transmissive mirror 124 as described in this graph 300 would competently reflect a first light 108 configured with a first bandwidth of 530 nm to 575 nm and likely competently transmit a second light configured with a wavelength greater than 600 nm and less than 500 nm. It should be understood that the selectively transmissive mirror 124 may have any reflection value of for any range of wavelengths. For example, the selectively transmissive mirror 124 may be configured to reflect from 95% to over 99% of light from 530 nm to 575 nm while reflecting essentially zero light at wavelengths greater than 610 nm and wavelengths less than 500. Therefore, the above description should not be considered a limitation of the present disclosure, but merely an illustration.

Figure 4:
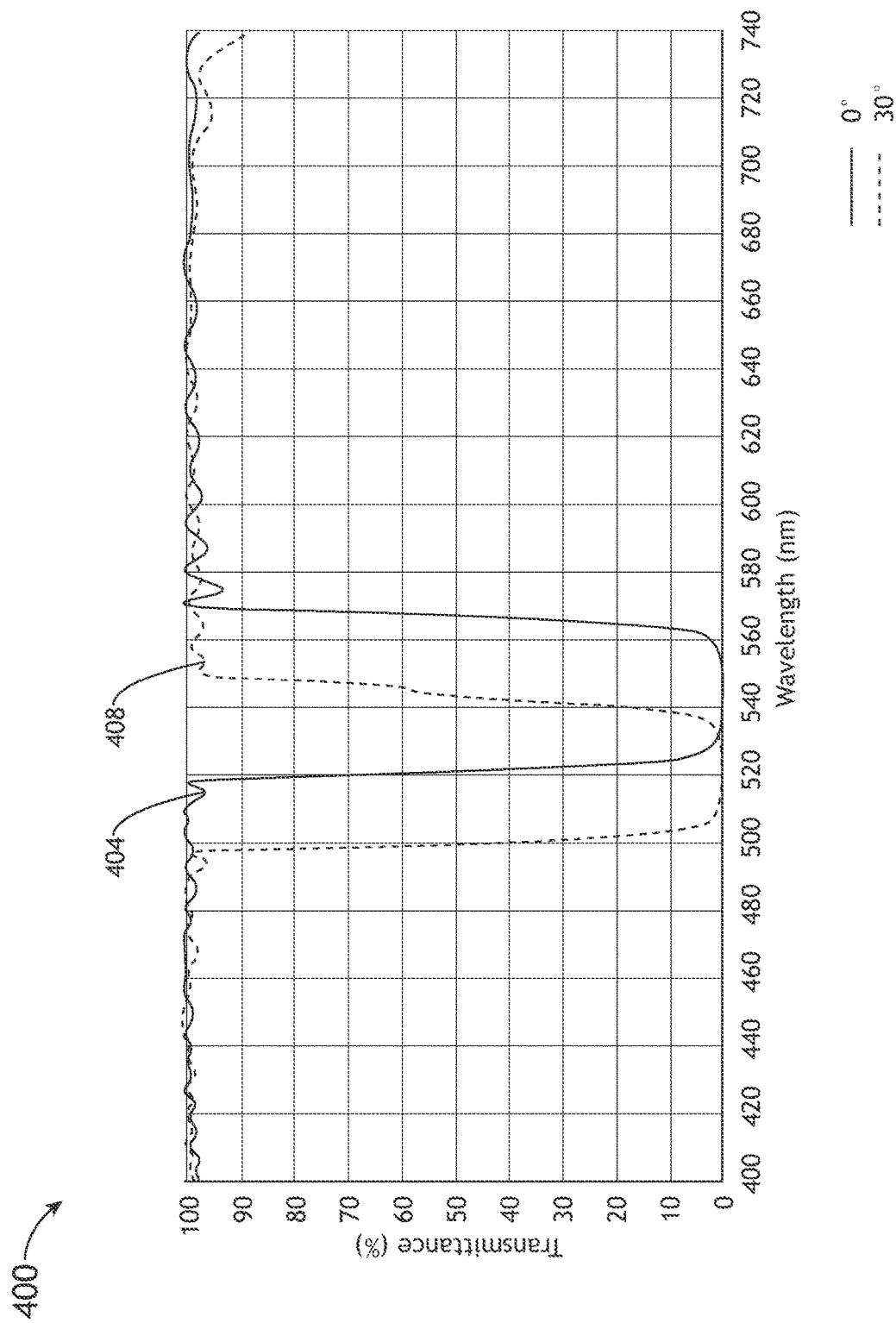
FIG. 4 is a graph illustrating the transmission capabilities of a representative selective transmissive mirror at two orientations with respect to a light beam, in accordance with one or more embodiments of this disclosure.

FIG. 4 is a graph 400 illustrating the transmission capabilities of a representative selective transmissive mirror 124 at two orientations with respect to a light beam, in accordance with one or more embodiments of this disclosure. For example, the graph 400 shows a normal angle of incidence curve 404 (e.g., the representative selective transmissive mirror 124 is perpendicular to the light beam) where approximately zero transmittance has been determined from 530 nm to 570 nm, whereas approximately 100% transmittance has been determined at wavelengths greater than 580 nm and less than 520 nm. In another example, example the graph 400 shows a 30° angle of incidence curve 404 (e.g., the representative selective transmissive mirror 124 is placed 30° from a plane perpendicular to the light beam) where approximately zero transmittance has been determined from 490 nm to 550 nm, whereas approximately 100% transmittance has been determined at wavelengths greater than 550 nm and less than 485 nm. The representative selective transmissive mirror 124 as described in this graph 400 would competently reflect a first light 108 configured with a first bandwidth of 490 nm to 570 nm, depending on the angle of incidence of the light beam relative to the mirror surface, and likely competently transmit a second light configured with a wavelength greater than 580 nm and less than 485 nm, again depending on orientation of the angle of incidence of the light beam relative to the mirror surface.

Figure 5:
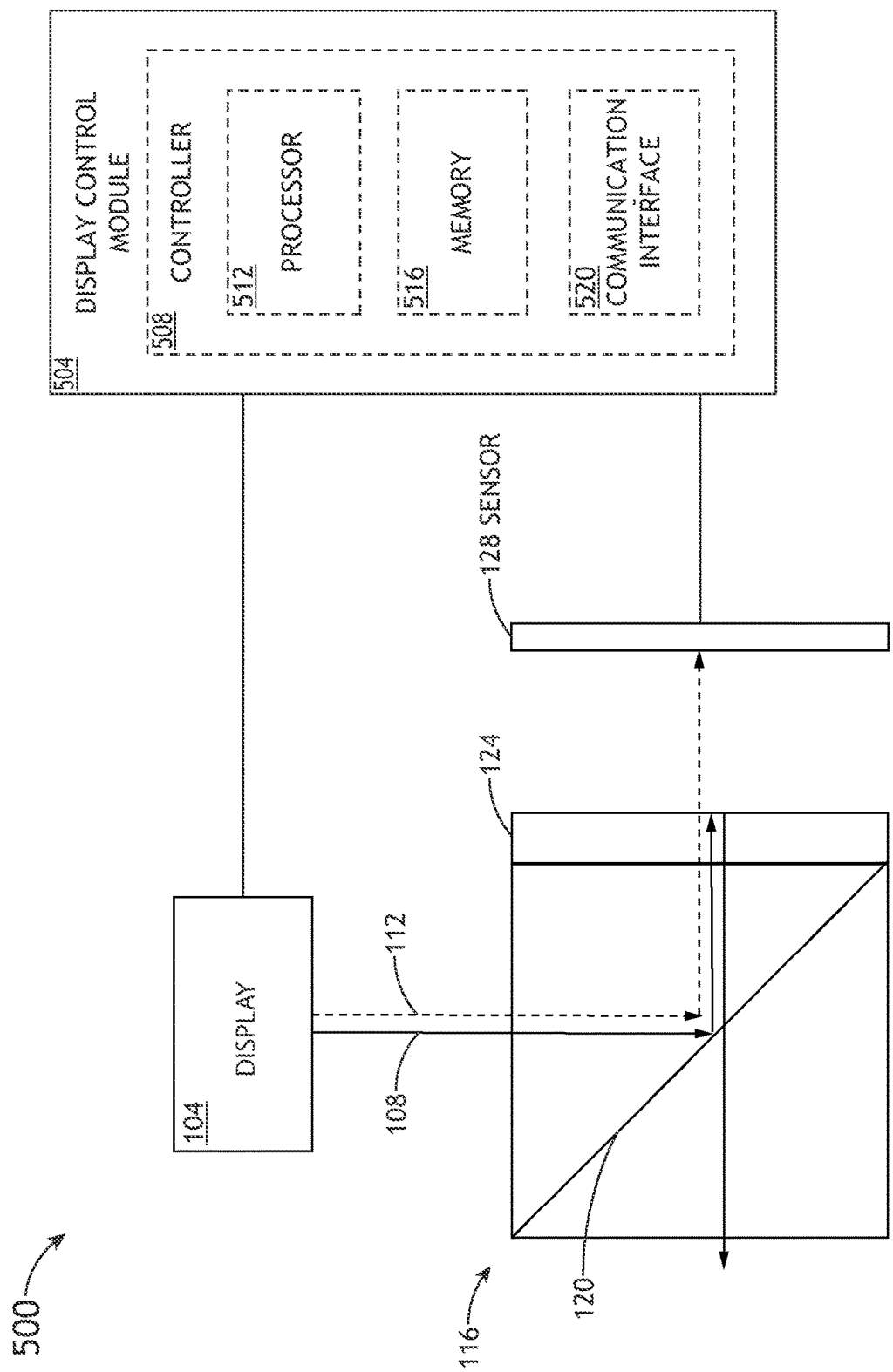
FIG. 5 is a block diagram illustrating a system for monitoring an image source, in accordance with one or more embodiments of the disclosure.

FIG. 5 is a block diagram illustrating a system 500 for monitoring an image source, in accordance with one or more embodiments of the disclosure. The system 500 may include one or more, or all of the components as system 100, 200 and vice-versa. In some embodiments, the system 500 includes a display control module configured to send one or more signals to the display 104 and receive signals from the sensor 128. For example, the display control module 504 may be configured to send input signal data for the first light 108 and/or the second light 112 to the display. In another example, the display module 504 may be configured to receive output signal data from the second light 112 via the sensor 128. The display control module 504 may then compare the input signal data to the output signal data and determine if the display 104 is working correctly. In embodiments, the display module includes a controller 508, one or more processors 512, memory 516, and a communication interface 520.

The controller 508 provides processing functionality for at least the display control module 504 and can include the one or more processors 512 (e.g., micro-controllers, circuitry, field programmable gate array (FPGA) or other processing systems), and resident or external memory 516 for storing data, executable code, and other information. The controller 508 can execute one or more software programs embodied in a non-transitory computer readable medium (e.g., memory 516) that implement techniques described herein. The controller 508 is not limited by the materials from which it is formed or the processing mechanisms employed therein and, as such, can be implemented via semiconductor(s) and/or transistors (e.g., using electronic integrated circuit (IC) components), and so forth.

The memory 516 can be an example of tangible, computer-readable storage medium that provides storage functionality to store various data and/or program code associated with operation of the controller 508, such as software programs and/or code segments, or other data to instruct the controller 508, and possibly other components of the display control module 504, to perform the functionality described herein. Thus, the memory 516 can store data, such as a program of instructions for operating the display control module 504, including its components (e.g., controller 508, communication interface 520, etc.), and so forth. The memory 516 may also store data derived from the sensor 128. It should be noted that while a single memory 516 is described, a wide variety of types and combinations of memory 516 (e.g., tangible, non-transitory memory) can be employed. The memory 516 can be integral with the controller 508, can comprise stand-alone memory, or can be a combination of both. Some examples of the memory 516 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 520 can be operatively configured to communicate with components of the display control module 504 and the system 500. For example, the communication interface 520 can be configured to retrieve data from the controller 508 or other components, transmit data for storage in the memory 516, retrieve data from storage in the memory 516, and so forth. The communication interface 520 can also be communicatively coupled with the controller 508 to facilitate data transfer between components of the display control module 504 and the controller 508. It should be noted that while the communication interface 520 is described as a component of the display control module 504, one or more components of the communication interface 520 can be implemented as external components communicatively coupled to the display control module 504 via a wired and/or wireless connection. The display control module 504 can also include and/or connect to one or more input/output (I/O) devices. In embodiments, the communication interface 520 includes or is coupled to a transmitter, receiver, transceiver, physical connection interface, or any combination thereof.

The system 100, 200, 500 makes use of wavelength selective material wavelength selective sources, thereby allowing the system 100, 200, 500 to detect display refresh irregularities, detect orientation irregularities, and/or confirm proper orientation of the display 104. The system 100, 200, 500 may also be used to sense uncommanded brightness increases, potentially protecting the pilot from a brightness hazard condition, such as an all-white-all-bright (AWAB) condition, wherein every pixel is activated with maximal brightness that may dazzle or flash blind a user.

Figure 6:
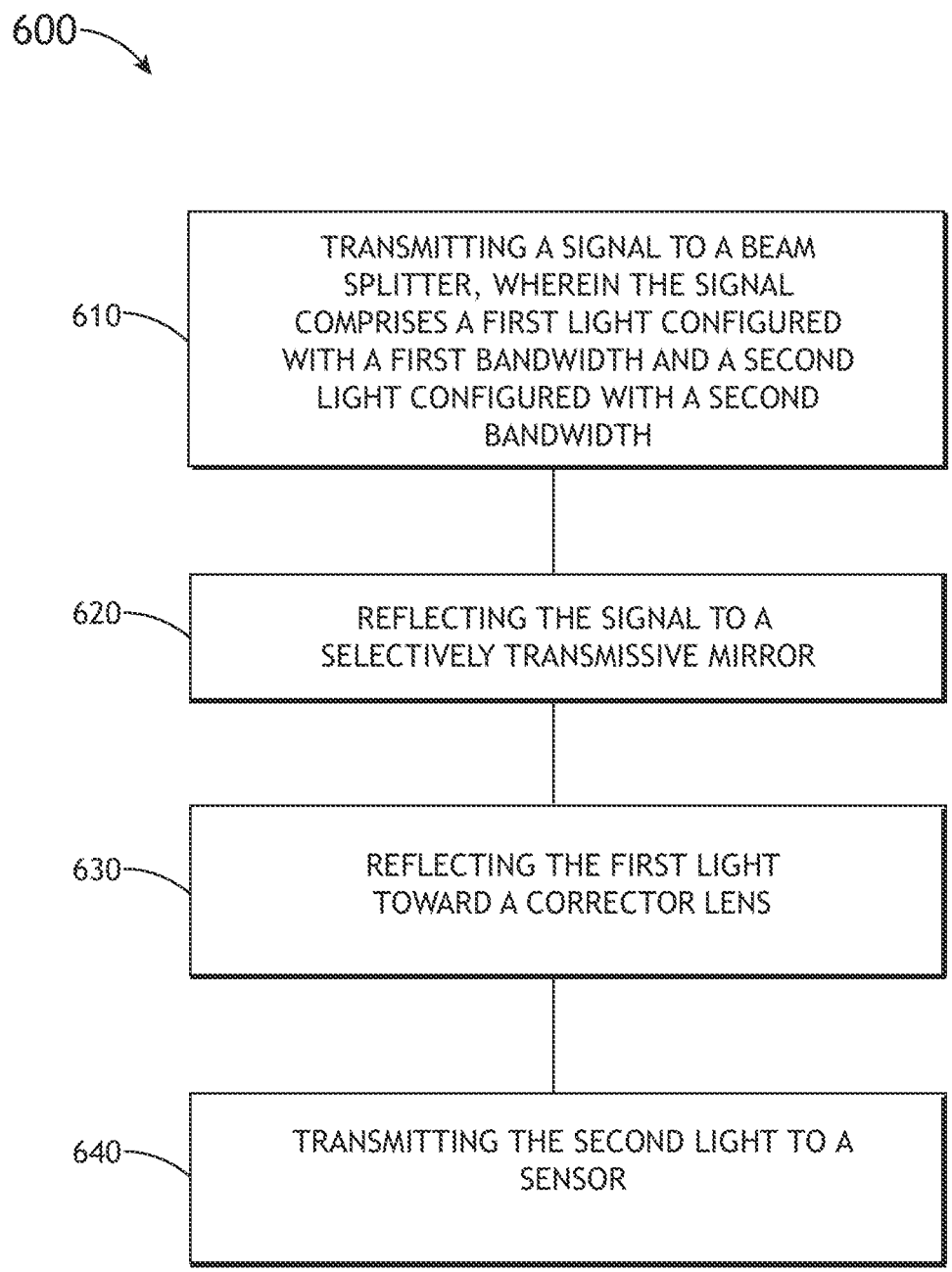
FIG. 6 is a flow chart illustrating a method 600 for displaying a display image and a reference image, in accordance with one or more embodiments of the disclosure.

FIG. 6 is a flow chart illustrating a method 600 for displaying a display image and a reference image, in accordance with one or more embodiments of the disclosure. In some embodiments, the method 600 includes a step 610 of transmitting a signal to the beam splitter wherein the signal comprises a first light configured with a first bandwidth and a second light configured with a second bandwidth. For example, the display 104 may be configured to transmit a signal that comprises both the first light 108 and the second light 112 through the field lens 212 to the beam splitter 116

In some embodiments, the method 600 further includes the step 620 of reflecting the signal to a selectively transmissive mirror 124. For example, the beam splitter 116 may receive the signal containing the first light 108 and the second light 112, and reflect the first light 108 and the second light 112 toward the sensor 128.

It should be understood that the light reflected from and reflected through the beam splitter 116 may represent a fraction of the light transmitted into the beam splitter 116. For example, the upon the receiving the transmission of the signal from the display 104, a portion of the light signal from the signal may transmit through the beam splitter 116 rather than be reflected from the beam splitter 116 toward the sensor 128. In another example, upon receiving the second light 112 from the selectively transmissive mirror 124, a portion of the second light may be reflected back toward the display. Therefore, the above description should not be considered a limitation of the present disclosure, but merely an illustration.

In some embodiments, the method 600 further includes the step 630 of reflecting the first light toward a corrector lens. For example, the first light 108 may be reflected from the selectively transmissive mirror 124 back through the beam splitter 116, through the corrective lens 216 toward the exit pupil.

In some embodiments, the method 600 further includes the step 640 of reflecting the second light 112 to the sensor 128. For example, the second light 112 may pass through the selectively transmissive mirror 124 and the one or more focusing lenses 220a-c, to the sensor 128, where the sensor detects the second light 112 and generates data based on the second light 112, which is sent to the data control module 504 for processing and comparison to the original signal.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
    a display configured to transmit a signal comprising:
        a first light configured as a display image; and
        a second light configured as a reference image;
    a sensor configured to detect the second light;
    a beam splitter configured to receive the signal and reflect the signal;
    a selectively transmissive mirror configured to receive the reflected signal, transmit the second light to the sensor, and reflect the first light, wherein the first light is configured with a first bandwidth, wherein the second light is configured with a second bandwidth; and
    a corrector lens configured to receive the first light and transmit the first light to an exit pupil.

2. The system of claim 1, wherein the system is configured as a head-up display or head worn display.

3. The system of claim 1, wherein the display is configured of at least one of a light-emitting diode display, a micro light emitting diode display, an organic light-emitting diode display, a liquid crystal display, and active-matrix liquid crystal display, a liquid crystal on silicon display, or a digital light processing display.

4. The system of claim 1, wherein the display is configured as a transmissive display, wherein the transmissive display comprising an illumination source, wherein the illumination source is configured as least one of a light emitting diode, a laser, or a light source with a dedicated bandwidth configured to leak towards a sensor path.

5. The system of claim 1, further comprising a field lens configured to receive the signal and transmit the signal to the beam splitter.

6. The system of claim 1, further comprising one or more focusing lenses configured to receive and transmit the second light.

7. The system of claim 1, wherein the first bandwidth comprises wavelengths in a range from 480 nm to 580 nm.

8. The system of claim 1, wherein the first bandwidth comprises wavelengths in a range from 530 nm to 560 nm.

9. The system of claim 1, wherein the second bandwidth comprises wavelengths in a range from 600 nm to 800 nm.

10. A method comprising:
    transmitting a signal to a beam splitter, wherein the signal comprises a first light configured with a first bandwidth and a second light configured with a second bandwidth;
    reflecting the signal to a selectively transmissive mirror;
    reflecting the first light toward a corrector lens; and
    transmitting the second light to a sensor.

11. The method of claim 10, wherein the first bandwidth comprises wavelengths in a range from 480 nm to 580 nm.

12. The method of claim 10, wherein the first bandwidth comprises at wavelengths in a range from 530 nm to 560 nm.

13. The method of claim 10, wherein the second bandwidth comprises wavelengths in a range from 600 nm to 800 nm.

14. The method of claim 10, further comprising receiving the first signal and transmitting the first signal through a field lens.

15. The method of claim 10, further comprising receiving the second signal and transmitting the second signal via one or more focusing lenses.

* * * * *